United States Patent Office 2,922,261
Patented Jan. 26, 1960

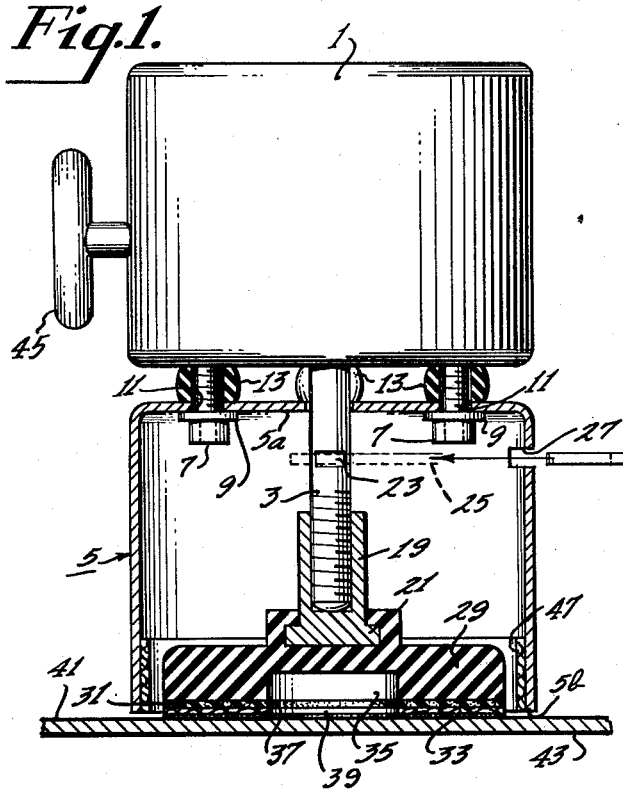
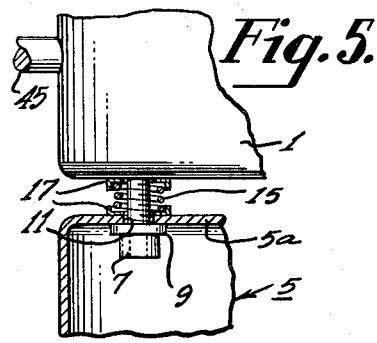
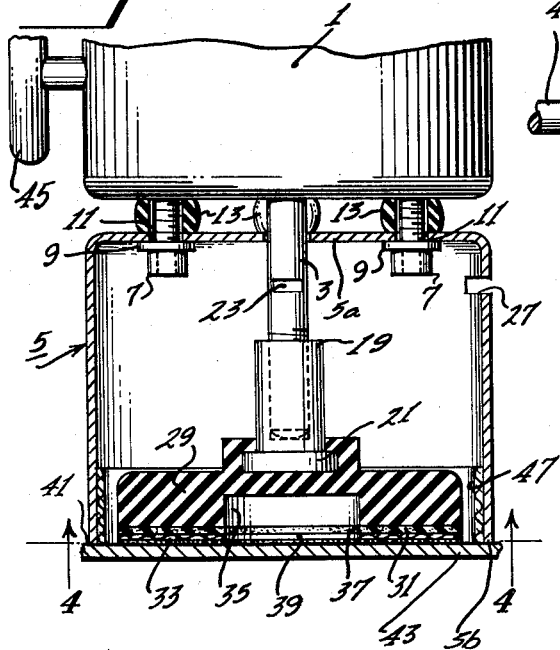
Jan. 26, 1960 — S. J. RABKIN ET AL — 2,922,261
APPARATUS FOR REMOVING SURFACE COATINGS
Filed April 24, 1957
Fig.1. Fig.5. Fig.2. Fig.3. Fig.4.
INVENTORS.
Samuel J. Rabkin &
Joseph G. Battista
BY
ATTORNEY.

2,922,261
APPARATUS FOR REMOVING SURFACE COATINGS
Samuel J. Rabkin, Brighton, and Joseph G. Battista, Cambridge, Mass.
Application April 24, 1957, Serial No. 654,748
7 Claims. (Cl. 51—170)

This invention relates to apparatus for removing surface coatings from various members, and more particularly to apparatus for cleaning the surfaces of cooking grill plates.

Cooking grills such as are used in restaurants and at lunch counters include a heated metallic plate on which food is generally fried. Many foods, such as bacon, hamburgers, etc., usually contain enough fat so that little, if any, greasing of the plate is necessary for such foods. On the other hand, when such foods as eggs are to be fried, it is necessary to first grease the plate rather liberally. In either case, during the course of a day there accumulates on the surface of the grill plate a coating of grease and fried food particles. This coating must be removed periodically not only for sanitary reasons and because the accumulated material tends to impart to the food an unappetizing flavor, but also in the interest of efficient grill operation.

Customarily, grill plates of the type under consideration are scraped clean manually by means of a steel scraper resembling a spatula. This is usually done at the end of the day, especially if the grill is in constant use throughout the day. The task of cleaning a grill plate having an accumulated surface layer of greasy, sticky, gummy, and sometimes crusty, hardened material is, to say the least, a tedious and laborious one, being quite unpleasant and especially unwelcome at the close of a working day. The scrapers which are used for this task frequently have sharp corners which leave scratches and/or gouge out nicks in the grill plate even when considerable care is exercised during the scraping operation. Since grill operators are tired at the end of a working day, the tendency is not to exercise too great care and to hasten the job. Thus, grill plates more often than not are left with nicks and scratches in which food particles and grease accumulate and from which it is extremely difficult to remove the collected matter, especially after it has hardened therein. The condition therefore becomes aggravated and can usually be corrected only by grinding down the surface of the plate to a depth beyond the nicks and scratches, only to be repeated at a later date. It is apparent, therefore, that present practices are not only time consuming and inefficient, but costly as well.

The primary object of our present invention is to provide an improved surface coating removing apparatus and method which will be entirely free from the aforementioned and other difficulties characteristic of devices and practices heretofore employed for cleaning and resurfacing various surfaces.

More particularly, it is an object of our invention to provide an improved cleaner for cooking grill plates which will thoroughly clean and condition the cooking surface thereof for sanitary and highly efficient operation.

Another object of our invention is to provide an improved grill plate cleaner as aforesaid which will perform the cleaning operation in a minimum of time and with a minimum of manual effort.

Still another object of our invention is to provide an improved grill plate cleaner as above set forth which will readily accommodate itself to surface coatings on the plate even when such coatings are uneven over the surface area of the grill plate.

A further object of our invention is to provide an improved grill plate cleaner as aforesaid which is very easy to operate and which can be handled efficiently even by an unskilled operator.

Still a further object of our invention is to provide an improved grill plate cleaner as set forth in which the cleaning element can be replaced quickly and easily.

Another object of our invention is to provide a grill plate cleaner as above set forth which will trap and collect the removed surface material, and from which such material can be cleaned readily and thoroughly with minimum effort.

Yet another object of our invention is to provide an improved grill plate cleaner as aforesaid which will be adjustable to provide a preset operating pressure depending on such factors as the nature and thickness of the surface coating on the grill plate.

A further object of our invention is to provide an improved grill plate cleaner such as set forth which will provide a highly clean, extremely smooth, polished surface entirely free from food-collecting scratches, gouges, ridges, nicks or the like.

Still a further object of our invention is to provide an improved grill plate cleaner as above set forth which is small in size, light in weight, economical to manufacture, easy to operate, and safe and practical to use.

It is also an object of our invention to provide a surface cleaning and conditioning device which lends itself to a variety of applications other than for grill plate cleaning, and which, in all applications, will be highly efficient in use.

In accordance with one form of our invention, the cleaner includes an electric motor to the casing of which an inverted, cup-like housing is adjustably attached for adjustment axially of the motor drive shaft. This drive shaft extends loosely into the housing through the closed end thereof and has connected to it, within the housing, a holder for an abrasive disc. The disc holder includes a layer of yieldable material, such as foam rubber, to which a disc of fine abrasive sheet material is secured. The disc holder is so shaped and located within the housing that the abrasive disc normally occupies a position slightly beyond and externally of the open end of the housing. However, when the abrasive disc is placed against the coated surface of a grill plate or other member to be cleaned and slight pressure is applied to the device in a direction toward such surface, the disc holder yields under the pressure and assumes a position such that the abrasive disc is substantially flush with the open end of the housing. At this time, both the open housing end and the abrasive disc are substantially flush against the surface coating to be removed. By simply gliding the device easily over the surface of the grill plate or other member to be cleaned, the surface coating is removed very quickly and effectively. It may be noted, by way of comparison, that a grill plate which requires upwards of a half hour to clean to an acceptable state in customary manner by means of a conventional scraper has been cleaned to an even far more acceptable state by means of our improved cleaning device in a matter of but a few minutes.

The coating material removed from the surface being cleaned is confined within the housing and largely thrown against the inner wall thereof by centrifugal force developed by the rotating abrasive disc holder. The inner wall of the housing is preferably lined with an easily removable lining of material to which the removed coating material will adhere, or into which it can be absorbed. Some of the removed coating material can also be trapped in a recess in the disc holder. A similar, easily removable lining may be placed within this recess, if desired. After the cleaning operation is completed, these linings and the material accumulated thereon can be readily removed and new, clean linings inserted into the housing and the recess. Thus, the device can be readied easily for the next cleaning operation. Moreover, by adjusting the housing axially along the motor shaft, the extent of normal protrusion of the disc holder and, hence, the amount of pressure necessary to bring the open end of the housing and the abrasive disc into flush relation can be varied to suit requirements. It is obvious, therefore, that the housing acts not only as a guard to prevent spreading of the removed coating material and, in fact, to accumulate this material within it, but also as a gauge for setting the extent of protrusion therefrom of the abrasive disc holder and, therefore, the amount of pressure to be applied to the device.

The invention, both as to its organization and method of operation, as well as additional objects and advantages thereof, will be understood more readily from the following description, when read in connection with the accompanying drawing, in which Figure 1 is a view partly in side elevation and partly in central, vertical section showing one form of surface coating removing device according to our present invention, the abrasive disc holder being shown protruding slightly from the open end of the housing and in the position which it normally occupies when the device is at rest, Figure 2 is a fragmentary plan view, partly in section, showing a tool which may be employed in cooperation with the motor drive shaft when the abrasive disc holder is to be either mounted on or removed from the drive shaft, Figure 3 is a view similar to Figure 1 but showing the device in operating condition with the open end of the housing and the abrasive disc in flush relation against a surface to be cleaned, Figure 4 is a bottom plan view of the device as seen from the open end of the housing along the line 4—4 of Figure 3, and Figure 5 is a fragmentary view similar to Figures 1 and 3, but showing a slightly different form of yieldable coupling between the motor casing and the guard-gauge housing.

Referring more particularly to the drawing, there is shown a motor having a casing 1 and a drive shaft 3. Adjustably connected to the motor casing 1 is an inverted, cup-like housing 5 which has its upper end 5a closed and its lower end 5b open. The adjustable connection between the motor casing 1 and the housing 5, the purpose of which will be set forth presently, may be effected by means of a plurality of circumferentially spaced bolts 7 having flanges 9 in engagement with the closed housing end 5a. The threaded stems of the bolts 7 pass loosely through openings 11 in the housing end 5a and are threadedly received in the motor casing 1. The bolts 7 also pass through resilient spacers between the motor casing and the closed housing end. These spacers, which may be in the form of rubber sleeves 13, as in Figures 1 and 3, or coil springs 15 held in retainer cups 17, as in Figure 5, constantly urge the housing away from the motor casing and against the bolt flanges 9.

The drive shaft 3 passes loosely through the closed housing end 5a and axially into the interior of the housing, being threaded to receive an adapter 19 having a flange 21. The threads on the shaft 3 and the adapter 19 are in such a direction that, with a load on the adapter, it will tend to tighten on the drive shaft as the drive shaft rotates. The shaft 3 may be provided with a pair of diametrically opposed flats 23 for engagement by the forked end of a wrench 25 which can be passed through a circumferential slot 27 in the housing 5 to hold the drive shaft 3 against rotation when it is desired either to attach the adapter 19 to the drive shaft or to remove the adapter from the drive shaft.

The flange 21 of the adapter is confined tightly within a supporting member or holder 29, such as a molded rubber disc, so that, as the drive shaft 3 and the adapter 19 rotate, the holder 29 will rotate with them. The holder disc 29 may be molded around the flange 21, or it may be secured thereto in any other convenient manner, as by an adhesive, or by screws or the like. Secured to the lower face of the disc 29, as by cement, is a pad 31 of fairly readily yieldable material, such as foam rubber, and secured to the lower face of the pad 31, also by cement, for example, is a sheet 33 of fine abrasive material suitable for removing the surface coating from the particular member to be treated thereby. The supporting member 29 has a central recess 35 therein, and the pad 31 and abrasive sheet 33 have, respectively, openings 37 and 39 therein in alignment with the recess 35 and through which access can be had into the recess 35 for a purpose shortly to be set forth.

To set the device for operation, the bolts 7 are initially turned to adjust the housing 5 axially of its open end 5b and of the drive shaft 3 to a position such that the abrasive sheet 33 will protrude slightly from the housing 5 through the open end 5b thereof and will, therefore, be disposed externally of the housing. The foam rubber pad 31 will usually also protrude partly from the housing 5. The extent to which the abrasive sheet 33 should protrude beyond the open end of the housing will be determined by such factors as the nature and thickness of the surface coating to be removed, the nature of the member on which the surface coating appears, the nature of the abrasive material on the sheet 33, etc.

To use the device, it is merely necessary to place the sheet 33 against the surface coating 41 on a member 43 to be cleaned, such as a grill plate. A slight pressure is then applied to the housing 5 in a direction toward its open end 5b, or toward the member 43, until the open end of the housing comes against the surface coating 41 and is substantially flush with the abrasive sheet 33. The readily yieldable pad 31 and, to some extent, the rubber holder disc 29 will yield in response to the applied pressure to permit assumption of this flush relationship. Since the foam rubber pad 31 is readily yieldable in a direction axially of the drive shaft 3 and the open end 5b of the housing 5 and can also yield angularly thereto, it is apparent that the abrasive sheet 33 will be self-leveling, so to speak, and will readily accommodate itself to the surface coating 41. Power is then applied to the motor to cause rotation of the holder 29 and the abrasive disc 33 carried thereby relative to the member 43, and the device is moved slowly over the surface coating 41 while both the open end 5b of the housing and the abrasive disc 33 are in engagement therewith. A handle 45 may be provided on the motor casing 1 to facilitate holding the device in place as it is moved over the surface coating 41. The coating is thereupon completely removed in a matter of but a few minutes and the surface of the member 43 is left completely clean. If the member 43 being cleaned is a metallic grill plate or hot plate, and the abrasive material on the disc 33 is fine emery grit, for example, the plate will not only be cleaned thoroughly, but its surface will be highly polished and free from scratches, gouges, nicks, and the like. Thus, the grill can be readied for sanitary, efficient service with a minimum of manual effort and in a minimum of time.

As the abrasive sheet 33 and its holder 29 rotate, the centrifugal force developed thereby tends to throw the removed surface coating material radially outwardly. However, since the open end 5b of the housing is in engagement with the member 43, this removed coating material cannot escape from the housing 5 but is confined and collected therein. To make possible the easy removal of such material from the housing 5, a liner 47 is provided therein. The liner 47 is made of a material which will readily collect the removed surface coating particles by absorption thereinto or by adhesion thereto. In the case of a grill plate cleaner, the liner 47 may be made of relatively stiff blotting paper, or of corrugated cardboard the corrugations of which preferably extend along the length of the housing 5. In other applications, as where the surface coating 41 is a layer of paint or varnish and the member 43 is of wood, for example, the liner 47 may be oil treated blotting paper or corrugated board to which the removed dust particles will adhere. In any case, some of the removed particles will enter the recess 35 through the openings 37 and 39 and will be trapped in the recess 35. If desired, the recess 35 may also be lined with a removable liner (not shown) suitable for collecting some of the removed particles. At the completion of the cleaning operation, the liner 47, and the liner in the recess 35 if one is used there, can be removed easily and replaced by new liners to ready the device again for immediate, efficient operation. Also, when the abrasive disc 33 has become worn, it can be stripped easily from the pad 31 and a new disc substituted therefor in a matter of but a few seconds.

Although we have shown and described but a single embodiment of our invention, it will undoubtedly be apparent that other forms thereof, as well as variations in the particular one described, are possible within the spirit of this invention. Furthermore, while emphasis has been placed herein on a cleaner suitable primarily for cleaning grill plates, it should be readily apparent that the invention is equally useful in removing paint from painted surfaces, rust and other oxidized material from various metal surfaces, wax coatings from linoleum and floors, etc., and in such operations as refinishing furniture and the like. We desire, therefore, that the foregoing shall be taken merely as illustrative and not in a limiting sense.

We claim as our invention:

1. Apparatus for removing from a member a surface coating thereon which comprises a housing having an opening at one end thereof, a drive shaft in said housing substantially co-axial with said opening, a supporting member carried by said drive shaft, a yieldable pad having opposed surfaces at one of which said pad is secured to said supporting member, said supporting member and pad being so disposed that said pad normally protrudes at least partially through said opening beyond said one end of said housing whereby the other one of said opposed pad surfaces is normally disposed outside of said housing, and a coating removing member on said other pad surface, said coating removing member normally occupying a position externally of said housing for direct application to the surface coating to be removed, said pad being normally free to yield upon application of pressure on said housing in a direction toward its said end until said housing end is also brought into engagement with said surface coating whereupon said pad and said coating removing member become disposed substantially within said housing, and said pad then being free from the influence of said pressure and from further yielding regardless of any additional pressure which may be applied to said housing in said direction.

2. Apparatus for removing from a member a surface coating thereon which comprises a housing having an opening at one end thereof, a drive shaft in said housing substantially coaxial with said opening, a motor carried by said housing for driving said drive shaft, a supporting member carried by said drive shaft, a yieldable pad having opposed surfaces at one of which said pad is secured to said supporting member, said supporting member and pad being so disposed that said pad normally protrudes at least partially through said opening beyond said one end of said housing whereby the other one of said opposed pad surfaces is normally disposed outside of said housing, and a coating removing member on said other pad surface, said coating removing member normally occupying a position externally of said housing for direct application to the surface coating to be removed, said paid being normally free to yield upon application of pressure to said housing in a direction toward its said end until said housing end is also brought into engagement with said surface coating whereupon said pad and said coating removing member become disposed substantially within said housing, and said pad then being free from the influence of said pressure and from further yielding regardless of any additional pressure which may be applied to said housing in said direction.

3. Apparatus according to claim 2 characterized in that said pad is of soft rubber whereby said pad is readily yieldable and compressible in response to even relatively slight pressure applied to said housing.

4. Apparatus according to claim 2 characterized by the addition of means for adjusting said housing in an axial direction along said drive shaft whereby the extent to which said pad normally protrudes beyond said housing can be varied.

5. Apparatus according to claim 2 characterized by the addition of means within said housing adjacent to said pad for receiving and collecting particles of said coating removed from said first named member by said coating removing member.

6. Apparatus for removing from a member a surface coating thereon which comprises a housing having an opening at its lower end, a drive shaft in said housing substantially coaxial with said opening, a motor carried by said housing for driving said drive shaft, a supporting member carried by said drive shaft at the lower end thereof, a yieldable pad having opposed surfaces at one of which said pad is secured to said supporting member, said supporting member and pad being so disposed that said pad normally protrudes at least partially through said opening beyond the lower end of said housing whereby the other one of said opposed pad surfaces is normally disposed below said housing lower end, and a coating removing member on said other pad surface, said coating removing member normally occupying a position below said housing lower end for direct application to the surface coating to be removed, said pad being normally free to yield upon application of pressure to said housing in a downward direction until said housing lower end is also brought into engagement with said surface coating whereupon said pad and said coating removing member become disposed substantially within said housing, and said pad then being free from the influence of said pressure and from further yielding regardless of any additional pressure which may be applied to said housing in said downward direction.

7. Apparatus for removing from a member a surface coating thereon which comprises a housing having an opening at one end thereof, a drive shaft in said housing substantially coaxial with said opening, a coating removing member, and means coupled to said drive shaft yieldably supporting said coating removing member for movement bodily in a direction axially of said drive shaft, said means normally maintaining said coating removing member at said opening in a position externally of said housing for direct application to the surface coating to be removed, said means being normally free to yield upon application of pressure on said housing in a direction toward its said one end until said housing end is also brought into engagement with said surface coating whereupon said coating removing member becomes disposed substantially within said housing, and said supporting means then being free from further yielding regardless of any additional pressure which may be applied to said housing in said direction whereby said coating removing member is then also free from the influence of said additional pressure.

References Cited in the file of this patent

UNITED STATES PATENTS

| 1,643,882 | Faiver | Sept. 27, 1927 |
| 2,552,471 | Watkins | May 8, 1951 |
| 2,666,281 | Tocci-Guilbert | Jan. 19, 1954 |
| 2,667,652 | Engel | Feb. 2, 1954 |
| 2,668,968 | Dobrowolski | Feb. 16, 1954 |